United States Patent [19]

Sakamoto et al.

[11] Patent Number: 5,220,624
[45] Date of Patent: Jun. 15, 1993

[54] APPARATUS FOR READING IMAGES AND METHOD FOR ENHANCING THE OUTLINES OF SHAPES

[75] Inventors: Takashi Sakamoto; Makoto Hirosawa, both of Kyoto, Japan

[73] Assignee: Dainippon Screen Mfg. Co., Ltd., Kyoto, Japan

[21] Appl. No.: 673,653

[22] Filed: Mar. 21, 1991

[30] Foreign Application Priority Data

Apr. 10, 1990 [JP] Japan ................................. 2-96099

[51] Int. Cl.⁵ .............................................. G06K 9/36
[52] U.S. Cl. ...................................... 382/54; 382/52; 358/166; 358/447
[58] Field of Search ....................... 382/54, 27, 52, 22; 358/447, 166; 364/413.13; 250/327.2; 328/135

[56] References Cited

U.S. PATENT DOCUMENTS

| | | | |
|---|---|---|---|
| 4,315,318 | 2/1982 | Kato et al. | 382/54 |
| 4,317,179 | 2/1982 | Kato et al. | 382/6 |
| 4,387,428 | 6/1983 | Ishida et al. | 364/413.13 |
| 4,591,923 | 5/1986 | Urabe et al. | 358/447 |
| 4,672,463 | 6/1987 | Tomohisa et al. | 358/447 |
| 4,747,052 | 5/1988 | Hishinoma et al. | 364/413.13 |
| 4,794,531 | 12/1988 | Morishita et al. | 382/54 |
| 4,844,288 | 7/1989 | Cho | 358/447 |
| 4,868,671 | 9/1989 | Morakami | 358/447 |
| 4,941,190 | 7/1990 | Joyce | 382/54 |
| 4,972,256 | 11/1990 | Hirosawa et al. | 358/447 |

FOREIGN PATENT DOCUMENTS

| | | |
|---|---|---|
| 51-88120 | 8/1976 | Japan . |
| 52-31615 | 3/1977 | Japan . |
| 53-140101 | 12/1978 | Japan . |
| 55-146451 | 11/1980 | Japan . |
| 62-62664 | 3/1987 | Japan . |
| 63-36185 | 7/1988 | Japan . |

*Primary Examiner*—David K. Moore
*Assistant Examiner*—David Fox
*Attorney, Agent, or Firm*—Lowe, Price, LeBlanc & Becker

[57] ABSTRACT

The present invention relates to a method for enhancing the outline of shapes that occur in an original image which has been obtained by the use of an electro-optical scanner or similar device for the purposes of preparation for printing. The apparatus for reading images comprises the RAM 12 where plural sets of data having the relationships between the difference signal S−U and the enhancement signal K·(S−U) are stored. By selecting a proper set, the outline enhancement or graininess sublimation threshold setting can be set according to color values and other photo aspects of the original, or according to the design of the original image and it's intended use.

10 Claims, 7 Drawing Sheets

| D00 | D01 | D02 | D03 | D04 |
| D10 | D11 | D12 | D13 | D14 |
| D20 | D21 | D22 | D23 | D24 |
| D30 | D31 | D32 | D33 | D34 |
| D40 | D41 | D42 | D43 | D44 |

F I G. 5
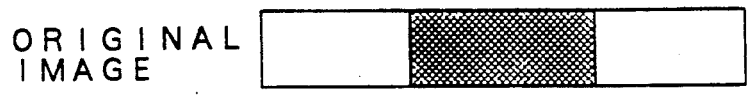
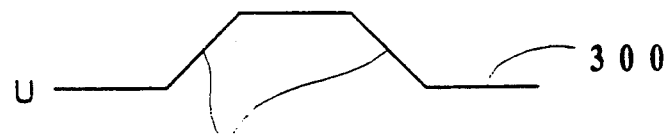
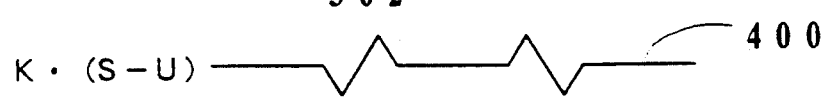
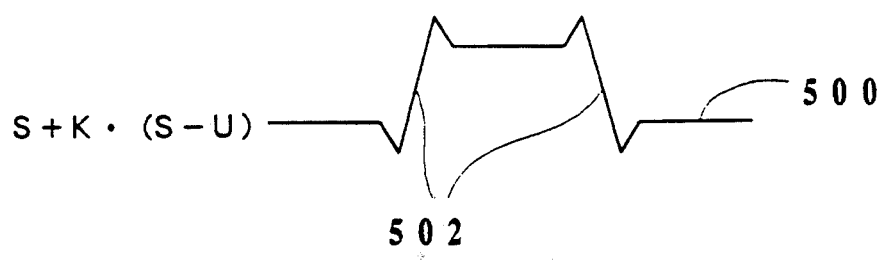

APPARATUS FOR READING IMAGES AND METHOD FOR ENHANCING THE OUTLINES OF SHAPES

BACKGROUND OF THE INVENTION

1. Field of the Invention

The present invention relates to a method for enhancing the outline of shapes that occur in an original image which has been obtained by the use of an electro-optical scanner or similar device for the purposes of preparation for printing.

2. Description of the Prior Art

The use of an electro-optical scanner, or similar device, for the purposes of preparing an image that will be printed or otherwise reproduced is quite common. The preparation steps often include effecting the enhancement of the outline of shapes that occur in the original image, in order to improve the sharpness of the image made by printing or reproduction. The principles for enhancing the outlines of shapes will be described hereinafter.

The original image is divided into many parts. Each part is referred to as a "pixel". An image signal S is produced by optically scanning one pixel from the original image. If value of this image signal S is represented by an 8-bit binary code, the image signal can express any one of 256 degrees of shading.

FIG. 2 shows a series of adjacent pixels scanned from an original image. A center pixel $D_{22}$, as shown in FIG. 2, is referred to as the "attention point". An image signal corresponding to the attention point is referred to as the "sharp signal". The 24 pixels surrounding the attention point ($D_{00}$-$D_{44}$, excepting $D_{22}$) are referred to as the "region adjacent to the attention point". A signal that is produced by averaging (or by weighted averaging) the signal levels of the pixels in the region adjacent to the attention point, is referred to as the "unsharp signal".

Enhancement of outlines is effected by using sharp signals $S_{xy}$, and unsharp signals $U_{xy}$ corresponding to each of the attention points in the matrix of an image $D_{xy}$. For example, assume that there is a line of pixels in the original image that may be represented as degrees of shading such as that shown in the original image 100 of FIG. 5. Then a series of sharp signal values, such as that shown the waveform 200 of FIG. 5, will result from scanning the original. Additionally, a series of unsharp signal values can be generated for each of the pixels making up the sharp signal, such that they may be represented by the waveform 300 of FIG. 5. In the waveform 300 of FIG. 5 the outline slopes 302 are gentler than the corresponding slopes in the waveform 200 of FIG. 5. Differential signals (S−U) can be generated by subtracting the unsharp signals U from the sharp signals S. An series of enhancement values ( K·(S−U) ) can be created by multiplying an enhancement coefficient K by the differential signal S−U as illustrated by the waveform 400 of FIG. 5. Finally, the enhancement values are added to the original sharp signal values to produce the enhanced signal representation shown in the waveform 500 of FIG. 5. By comparing the height of the signals shown in the waveform 500 of FIG. 5 with the height of the original sharp signals shown in the waveform 200 of FIG. 5, it can be seen that the absolute height of the enhanced signal is higher in the slope region 502 of FIG. 5 than in the original sharp signal. This means that the outline of the original image has been effectively enhanced.

This existing method of outline enhancement has the failing that it will operate equally on noisy picture elements, especially any graininess in the original, as well as on the actual shapes in the original image. As a result undesirable noisy elements are also enhanced. To prevent this occurrence, the enhancement coefficient K is effectively reduced to 0 when the absolute value of the differential signal (S−U) is less than a predetermined threshold value T, which is generally called the "Graininess sublimation", in the view that enhancement of graininess in the original is sublimated. The effect of modifying the value of coefficient value K, as just described, is shown in FIG. 6A. In the region A where the absolute value of the differential signal (S−U) is less than the predetermined threshold value T, the enhancement values ( K·(S−U) ) corresponding to that region A have 0 value. Consequently, outline enhancement of image areas that have relatively small changes in shading (like noisy or grainy areas) is suppressed and the problem described above is solved.

Sublimation of graininess may also be achieved by properly setting up the relationship between the differential signal S−U and the enhanced signal ( K·(S−U) as shown in FIG. 6B and FIG. 6C. In this fashion, sublimation of graininess can also prevent the unwanted enhancement of noise in the image.

The just described pre-existing methods for enhancing the outline still contain problems that will now be described.

The prior methods of graininess sublimation operate equally upon all degrees of shading. Therefore when noise occurs only at a certain degrees of shading and when the image has small levels of change in shading that occur at different points in the degrees of shading than where the noise is taking place, these small levels of actual image change are suppressed along with the noise. That is, complete enhancement of the desired shapes in the image cannot be effected when they are represented by small levels of shading difference and noise suppression is actively taking place.

SUMMARY OF THE INVENTION

It is a primary object of the present invention to make available an apparatus for reading images and a method for enhancing the outlines of shapes in those images that will sublimate the graininess or noise of the image and yet not fail to enhance desired parts of the image.

An apparatus for reading images, that has the function of enhancing the outlines within those images, comprises:

(a) means for producing a sharp signal which is an image signal derived from scanning an attention point in the original image;

(b) means for producing an unsharp signal derived by averaging the values of image signals obtained by scanning predetermined pixels adjacent to the attention point;

(c) means for producing an enhancement value that is calculated by multiplying an enhancement coefficient times a differential signal which has itself been calculated by subtracting the unsharp signal from the sharp signal;

the enhancement coefficient shall be set effectively to 0 when the absolute value of the differential signal is less than a predetermined threshold value;

the predetermined threshold value shall vary according to the value of the sharp signal or the unsharp signal; and (d) means for producing an enhanced image signal derived from adding the enhancement value to the sharp signal.

A method for reading images, that has the function of enhancing the outlines within those images, comprises:

(a) a step of producing a sharp signal which is an image signal derived from scanning an attention point in the original image;

(b) a step of producing an unsharp signal derived by averaging the values of image signals obtained by scanning predetermined pixels adjacent to the attention point;

(c) a step of producing an enhancement value that is calculated by multiplying an enhancement coefficient times a differential signal which has itself been calculated by subtracting the unsharp signal from the sharp signal;

the enhancement coefficient shall be set effectively to 0 when the absolute value of the differential signal is less than a predetermined threshold value;

the predetermined threshold value shall vary according to the value of the sharp signal or the unsharp signal; and (d) a step of producing an enhanced image signal derived from adding the enhancement value to the sharp signal.

While the novel feature of the invention are set forth particularly in the appended claims, the invention, both as to organization and content, will be better understood and appreciated, along with other object and features thereof, from the following detailed description taken in conjunction with the drawings.

BRIEF DESCRIPTION OF THE DRAWINGS

FIG. 5 is a series of waveform diagrams used in explaining the principles of enhancing the outline of shapes.

DETAILED DESCRIPTION OF THE PREFERRED EMBODIMENT

Figure 7:
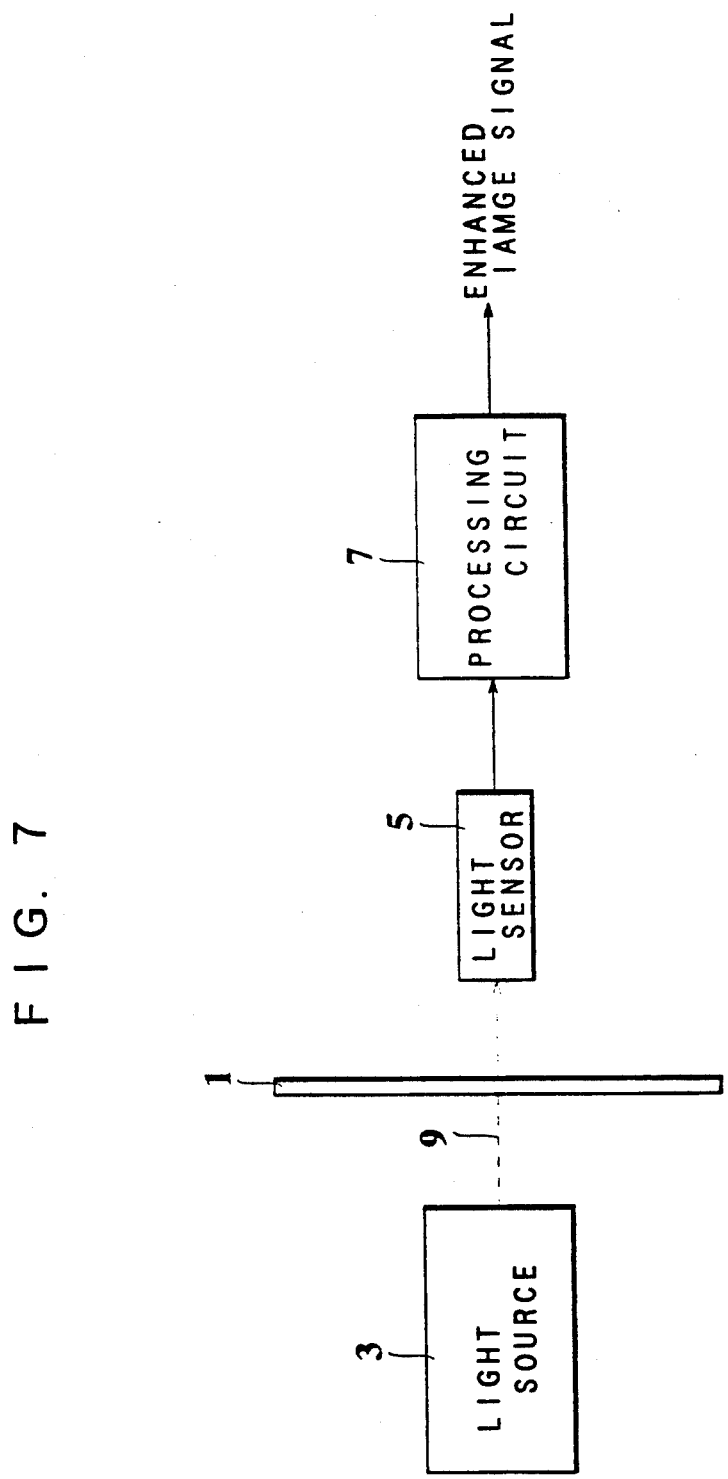
FIG. 7 is a block diagram showing the total institution of an apparatus for reading images.

FIG. 7 is a block diagram showing the total institution of an apparatus for reading images. Beam 9 from a light source 3 pass through the original image 1 and focus on a light sensor 5. Meanwhile the beam 9 from the light source 3 may be reflected by the original image 1 and focus on a light sensor 5. Meanwhile CCD, photomultiplier and the like is used as the light sensor 5. The beam 9 given to the light sensor 5 is converted into its electric equivalent. It is fed to a processing circuit 7 and is processed. Therefore the processing circuit 7 generates an enhanced image signal output.

Figure 1:
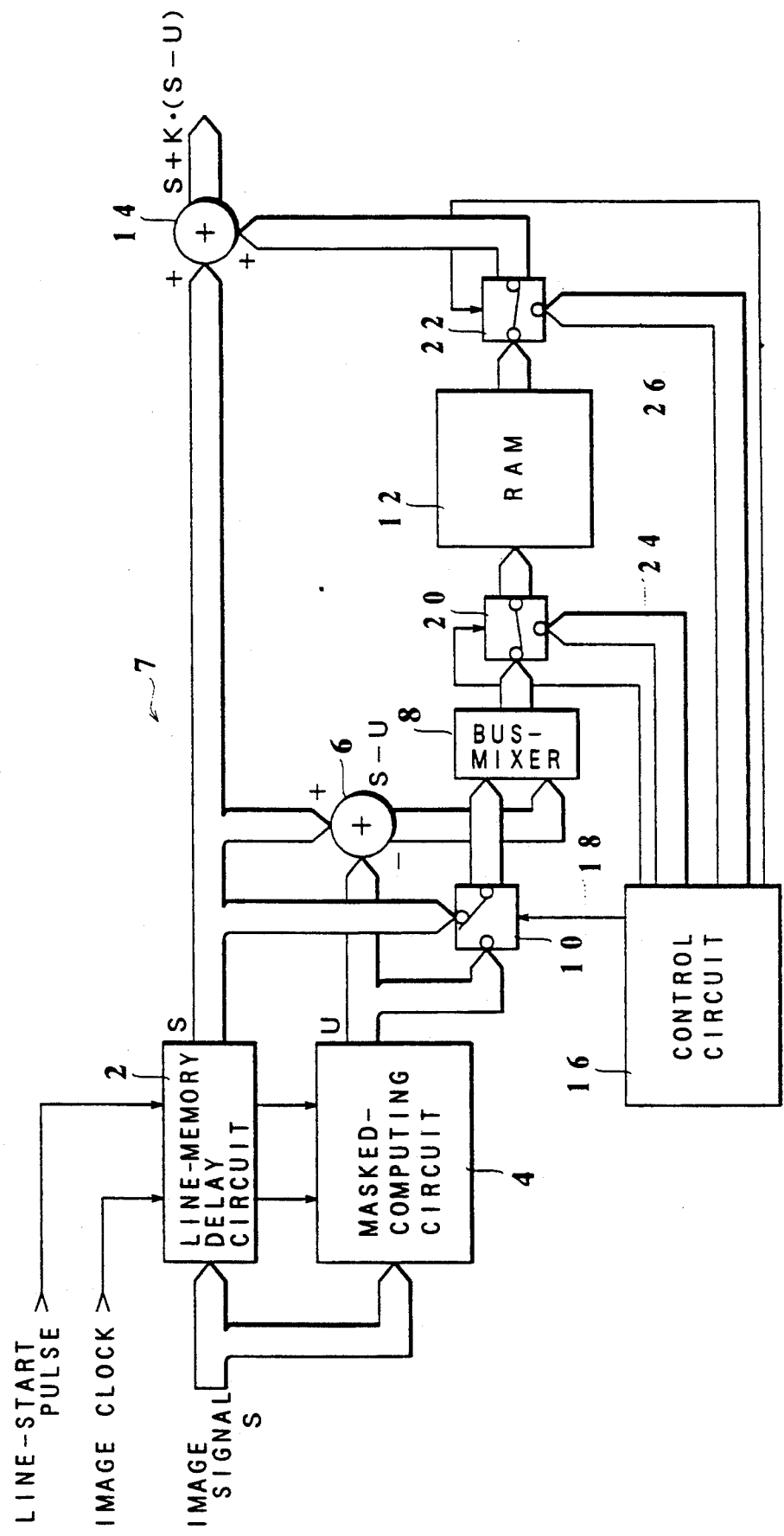
FIG. 1 is a block diagram for effecting the enhancement of the outlines of shapes representing an embodiment of the present invention.
Figures 2, 3:
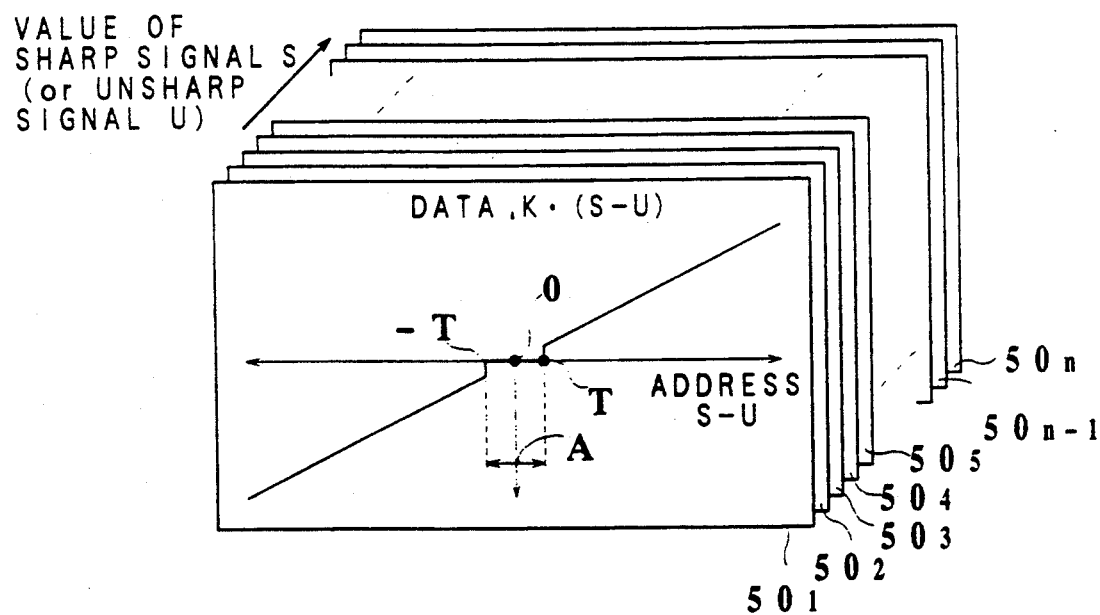
FIG. 2 is a diagram explaining the attention point and the region adjacent to it.
FIG. 3 is a diagram showing the relationship between data and addresses in RAM 12.

FIG. 1 is a block diagram of the processing circuit 7 for effecting the enhancement of the outlines of shapes representing an embodiment of the present invention. In FIG. 1 8-bit binary digital signals S are fed to the input terminals of both the line-memory circuit 2 and the masked-computing circuit 4. These digital signals S have originally been produced by converting analog signals, which are obtained by scanning pixels in the original image with a photoelectric cell, into their digital equivalents. The input of these signals is regulated by a line-start pulse and an image-clock signal. In masked-computing circuit 4 an unsharp signal U is produced according to computations based on the value of image signal S. In FIG. 2, the pixel $D_{22}$ is designated as the "attention point". Then all the pixels surrounding the pixel $D_{22}$, but not including the pixel $D_{22}$, are called the "region adjacent to the attention point". An unsharp signal $U_{22}$ is produced by averaging the image signals corresponding to the pixels in the region adjacent to the attention point. In a different embodiment the unsharp signal may be produced by averaging the image signals from all the pixels including the image signal from the pixel representing the attention point $D_{22}$.

The masked-computing circuit 4 may be built from discrete logic components or it may be an integrated circuit such as a DSP.

The image signal $S_{22}$, corresponding to the attention point $D_{22}$, is fed to the input of the line-memory delay circuit 2 where it is held for an appropriate amount of time and is then presented unmodified at the output as sharp signal $S_{22}$. Since the unsharp signal $U_{22}$ is derived from the region around the attention point $D_{22}$, it takes additional time for the values from that region to completely enter the circuitry 2. Thus the sharp signal $S_{22}$ is delayed until the corresponding unsharp signal $U_{22}$ has been fully acquired and computed. When the delay circuitry is built in the form of a circular memory, the delay necessary to synchronize the sharp and unsharp signals can be produced by positional offsets of the read and write addresses delivered to the delay circuit. In this fashion the sharp signal $S_{22}$ and the unsharp signal $U_{22}$, each represented as an 8-bit binary code, are obtained by the rest of the processing circuitry at the same time.

The sharp signal $S_{22}$ is then fed to the additive input of a binary adder and the unsharp signal $U_{22}$ is fed to the subtractive input of that same adder. This results in an 8-bit binary output from the adder that is the differential signal $S_{22}-U_{22}$.

The differential signal $S_{22}-U_{22}$ is then sent to the bus-mixer 8 as the lower eight bits of an address. At the same time, the sharp or unsharp signal (selected by switch 10) is sent to the bus-mixer 8 as the upper 8 bits of the address. FIG. 1 shows the sharp signal S being selected by switch 10. The address bus-mixer 8 produces 16 bit address data at its output with the upper 8 bits based on the sharp signal $S_{22}$ and the lower 8 bits based on the differential signal $S_{22}-U_{22}$. Because the value of the differential signal could be a negative number the minimum absolute value allowed to be presented as address data is 0. The 16 bit address data is fed to RAM 12 as a read address.

The data in the RAM 12 location that is pointed to by the address is presented as read data to the adder 14. This data represents the enhancement value $K_{22} \cdot (S_{22}-U_{22})$. The sharp signal value $S_{22}$ is also presented to adder 14. These two values are added to produce an enhanced image signal $S_{22}+K\cdot(S_{22}-U_{22})$ which is output from adder 14.

FIG. 3 shows the relationship between addresses and data stored in RAM 12. The horizontal axis represents the addresses which correspond to the differential signal $S-U$. The vertical axis represents the data at a particular address which are the enhancement values $K\cdot(S-U)$ that correspond to the differential signals $S-U$. Except in region A where the differential signal $S-U$ has a small absolute value, the data represent the multiplication of the predetermined enhancement coefficient K times the level of the differential signal $S-U$. When the differential signal level is below the predetermined threshold value T as in region A, the enhancement coefficient K drops to zero and the resulting enhancement value $K\cdot(S-U)$ is zero. If the differential signal $S-U$ is small, graininess sublimation is not performed.

Figure 6A:
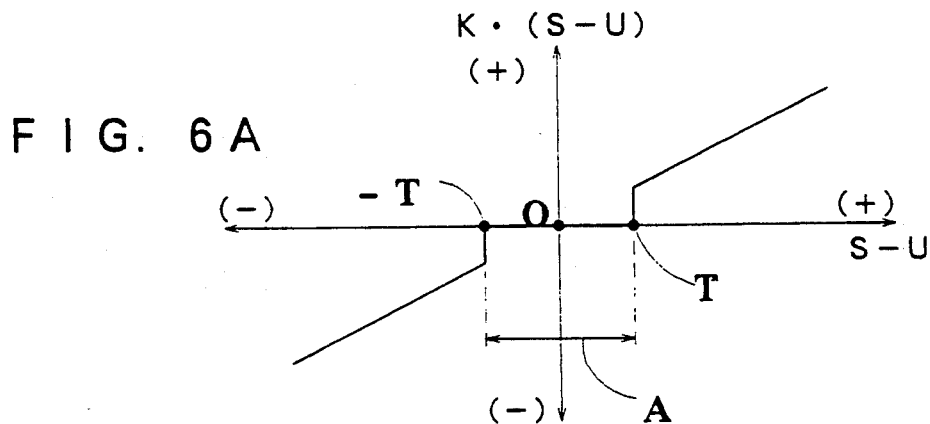
FIGS. 6A, 6B and 6C are graphs representing the relationship between the differential signal $S-U$ and the enhancement value $K \cdot (S-U)$.
Figure 6B:
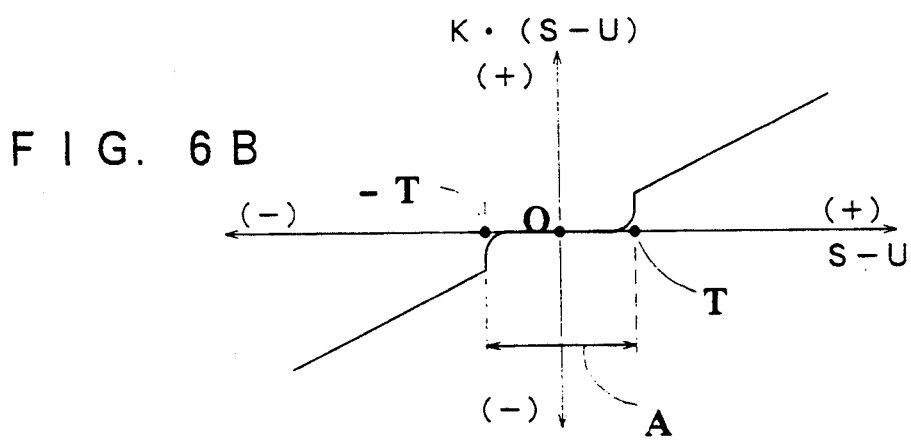
Figure 6C:
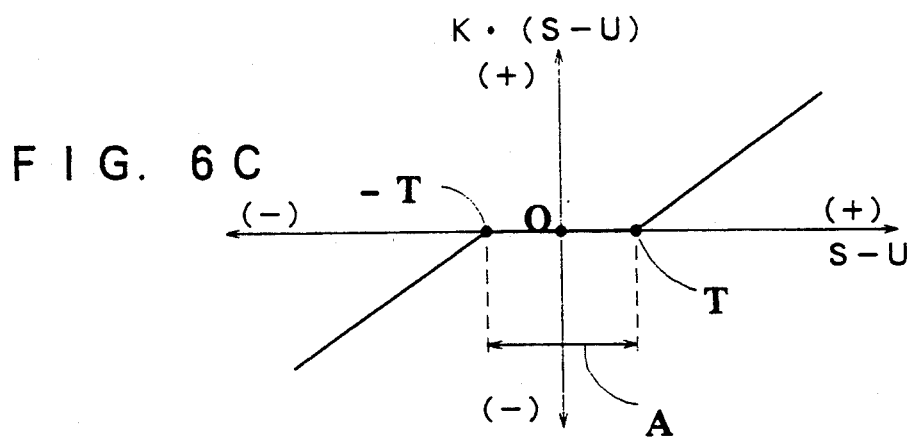

In other embodiments the relationship between address and data may be set differently such as the relationships shown in FIGS. 6B and 6C.

Plural sets of data having relationships such as those just described are stored in RAM 12. Each set is referred to as a "plane". For example in FIG. 3 there are N sets of planes represented as $50_1$ to $50_n$ which are stored in RAM 12. The upper eight bits of the address presented to RAM 12 (the value of the sharp signal S), determine which plane of data are read.

Figure 4A:
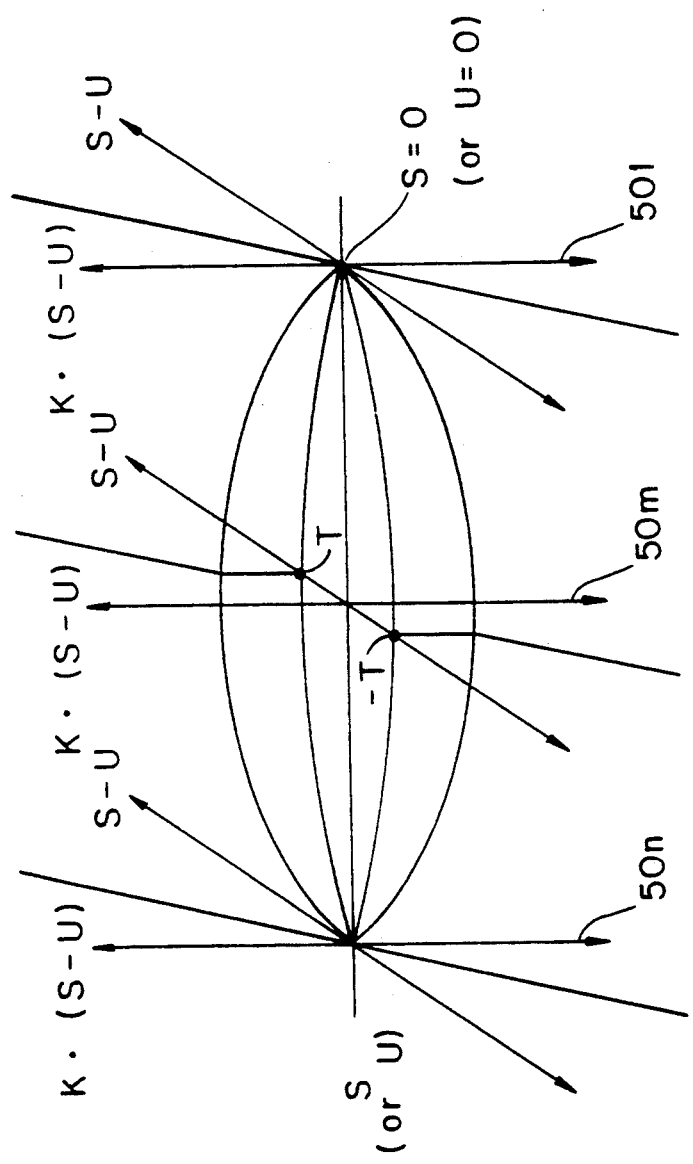
FIGS. 4A and 4B are diagrams showing the relationships between the sharp signal S (or the unsharp signal U) and the predetermined threshold value T.

FIG. 4A shows one embodiment of relations between the predetermined threshold value T and the sharp signal S (or the unsharp signal U). As shown in FIG. 4A, when the value of the sharp signal S is in the midrange of values, the predetermined threshold value T is set to a maximum so as to effect the maximum of graininess sublimation. When the value of the sharp signal S is at an extreme, either maximum or minimum, the predetermined threshold value T is set to zero and no sublimation of graininess will occur. The relationships shown in FIG. 4A are quite effective in pictures such as portraits where skin is the major feature and therefore graininess is not wanted. In this case maximum sublimation of graininess will occur in the skin tones because they occur in the middle range of shading.

Figure 4B:
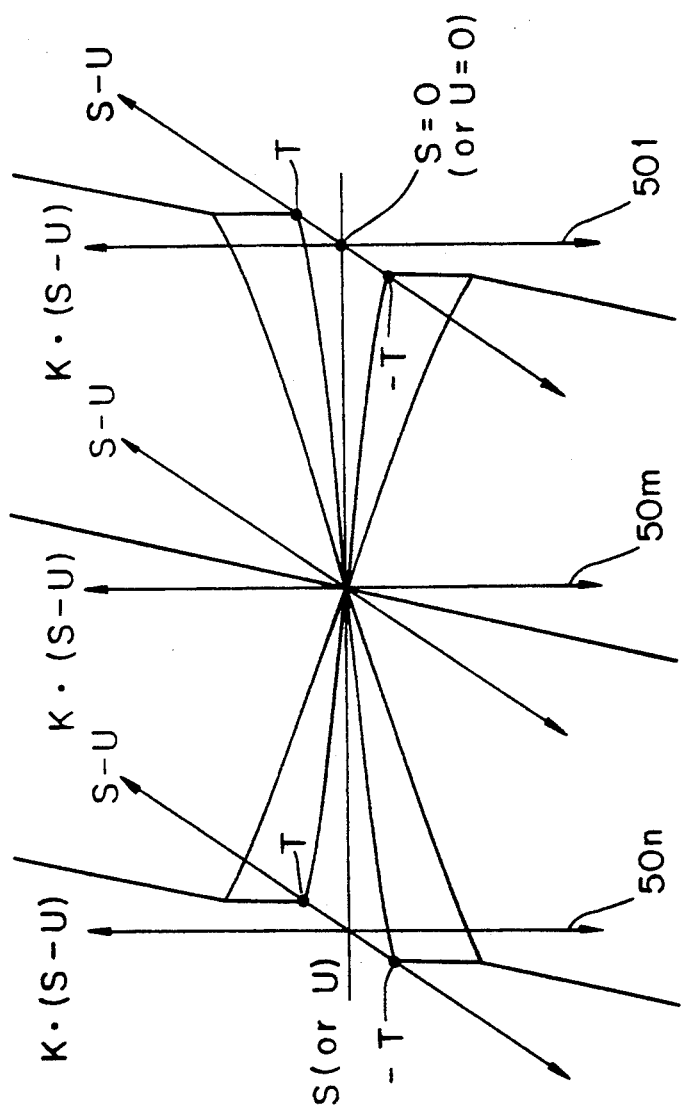

FIG. 4B shows another embodiment of the relations between the predetermined threshold value T and the sharp signal S (or unsharp signal U). FIG. 4B is the opposite of FIG. 4A in that the maximum sublimation of graininess will occur when the values for the sharp signal S are at the extremes, either maximum or minimum. Graininess will be largely unaffected when the signal values are in the midrange of shades. This approach is quite effective with pictures of objects like automobiles where the outlines of the shapes having shading values in the midrange will be quite striking.

In yet other embodiments, not represented here, the area of shading where the sublimation of graininess will or will not occur can be quite easily controlled, according to the desired goal, by modifying the relationships described above.

When graphic illustrations are made of the relationships, and these relationships are symmetrical in nature only half the data need be stored in RAM 12, as the other half may easily be created by a change of sign. In other words the size of the RAM necessary may be halved.

Further, this principle can be applied to the planes of data as well. When the data of the planes is symmetrical about the center or middle plane $50_m$ the necessary size of the RAM can cut in half.

In the embodiment described above, the value of the sharp signal S was used to determine the plane of RAM 12 which would be used. Equally the value of the unsharp signal U may be used to determine the plane. This selection is effected by sending a control signal from control element 16 through control line 18 to selector switch 10.

Ordinarily, selector switch 20 will be set to select data from the address bus-mixer 8 and selector switch 22 will be set to send data from RAM 12 to adder 14. When it is desired to write or to rewrite data in RAM 12, control element 16 can signal selector switch 20 to pass data from address bus 24 to RAM 12 and it can be used to set selector switch 22 to pass data into RAM 12 from data bus 26. Then address bus 24 will convey the write address and data bus 26 will convey the data to be written into RAM 12.

In the embodiment described, the region adjacent to the attention point was described as having 24 (or 25) pixels in a roughly square formation. The number of pixels in the region adjacent to the attention point may have any number of pixels and the shape may also be different, such as a circle, a regular polygon or any other desired planar shape.

In the embodiment described above the unsharp signal is derived by averaging or weighted averaging of the digitized values of pixels. This signal may also be created by averaging the signals of the region adjacent to the attention point while they are still in an analog form, or it may be created by an optical averaging scheme which could for example use a scanner with large aperture diameter.

The present invention may also be embodied in an entirely analog fashion to achieve the same effect.

In the above mentioned embodiments, the threshold value for the effecting graininess sublimation, varies according to the sharp or unsharp signal values. The outline enhancement or graininess sublimation threshold setting may also be set according color values and other photo aspects of the original, or according to the design of the original image and it's intended use.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus for reading images and enhancing the outlines within those images, comprising:
    means for scanning in an original image and generating image signals corresponding to pixels in said original image;
    means for providing a sharp signal having a value corresponding to an attention point pixel in said original signal;
    a delay circuit for holding said sharp signal for a predetermined time;
    means for producing an unsharp signal by averaging the values of image signals obtained by scanning predetermined pixels adjacent to the attention point pixel;
    means for providing an enhancement value by multiplying an enhancement coefficient times a differential signal, said differential signal being produced by subtracting the unsharp signal from the sharp signal; and means for producing an enhanced image signal by adding the enhancement value to the sharp signal, wherein the enhancement coefficient is set effectively to 0 when the absolute value of the differential signal is less than a predetermined threshold value, and the predetermined threshold value varies according to the value of the sharp signal or the unsharp signal.

2. The apparatus in accordance with claim 1 wherein: said image signals are analog signals.

3. The apparatus in accordance with claim 1 wherein: said image signals are digital signals.

4. The apparatus in accordance with claim 3 wherein: said predetermined threshold value is determined by a table stored in a memory.

5. The apparatus in accordance with claim 3 wherein: said predetermined threshold value is determined by computing.

6. A method for reading images and enhancing the outlines within those images, comprising the steps of:

scanning in an original image and generating image signals corresponding to pixels in said original image;

providing a sharp signal having a value corresponding to an attention point pixel in said original signal;

holding said sharp signal for a predetermined time in a delay circuit;

producing an unsharp signal by averaging the values of image signals obtained by scanning predetermined pixels adjacent to the attention point pixel;

providing an enhancement value by multiplying an enhancement coefficient times a differential signal, said differential signal being produced by subtracting the unsharp signal form the sharp signal and producing an enhanced image signal by adding the enhancement value to the sharp signal, wherein the enhancement coefficient is set effectively to 0 when the absolute value of the differential signal is less than a predetermined threshold value; and the predetermined threshold value varies according to the value of the sharp signal or the unsharp signal.

7. A method in accordance with claim 6 wherein: said image signals are analog signals.

8. The method in accordance with claim 6 wherein: said image signals are digital signals.

9. The method in accordance with claim 8 further comprising the step of:

determining said predetermined threshold value by accessing a table of values stored in a memory.

10. The method in accordance with claim 8 wherein: said predetermined threshold value is determined by computing.

* * * * *